US012321757B2

(12) United States Patent
Chua et al.

(10) Patent No.: US 12,321,757 B2
(45) Date of Patent: Jun. 3, 2025

(54) DECREASING APPARENT LOAD TIME FOR A FRONTEND APPLICATION WHEN REQUESTING A PAGE FROM A BACKEND APPLICATION OF A MULTIUSER COLLABORATION TOOL

(71) Applicants: Atlassian Pty Ltd., Sydney (AU); Atlassian Inc., San Francisco, CA (US)

(72) Inventors: Chung Chua, Sydney (AU); Sergey Chebykin, San Mateo, CA (US); Ilia Fainshtroy, Mountain View, CA (US); Jack Brown, Sydney (AU); Xiaoxi Han, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 668 days.

(21) Appl. No.: 17/565,651

(22) Filed: Dec. 30, 2021

(65) Prior Publication Data
US 2023/0214230 A1    Jul. 6, 2023

(51) Int. Cl.
*G06F 9/44* (2018.01)
*G06F 9/445* (2018.01)

(52) U.S. Cl.
CPC ...... *G06F 9/44505* (2013.01); *G06F 9/44557* (2013.01)

(58) Field of Classification Search
CPC ................. G06F 1/32; G06F 9/44; G06F 1/12
See application file for complete search history.

(56) References Cited

U.S. PATENT DOCUMENTS

| 8,380,820 | B1 * | 2/2013 | Kumarjiguda | ........ H04L 67/025 709/224 |
| 8,572,703 | B2 * | 10/2013 | Kitada | .................... G06F 21/41 726/6 |
| 2017/0264579 | A1 * | 9/2017 | Fang | ..................... H04L 51/212 |
| 2023/0086308 | A1 * | 3/2023 | Lim | ...................... G06F 16/958 |

* cited by examiner

*Primary Examiner* — Keshab R Pandey
(74) *Attorney, Agent, or Firm* — Brownstein Hyatt Farber Schreck, LLP

(57) ABSTRACT

Systems and methods for servicing page requests from a cloud-based software service. In particular, page tree elements defining a page requested from a backend of a cloud-based software service can be can be transmitted to a client device that originated the page request and loaded, client-side, in an order that prioritizes, in one example, features and functionality used most frequently by a particular user of the cloud-based software service.

19 Claims, 6 Drawing Sheets

DECREASING APPARENT LOAD TIME FOR A FRONTEND APPLICATION WHEN REQUESTING A PAGE FROM A BACKEND APPLICATION OF A MULTIUSER COLLABORATION TOOL

TECHNICAL FIELD

Embodiments described herein relate to cloud-based software platforms and, in particular, to systems and methods for determining an order and/or timing by which to transmit elements of a page tree to a frontend application, from a backend application, to decrease apparent load time of the frontend application.

BACKGROUND

An organization can equip its employees with a suite of cloud-based software tools to facilitate cooperation and completion of work. Each software tool can provide a unique set of features and functionality to its users, the employees of the organization.

Most users, however, only leverage a small subset of features and functionality provided by such cloud-based software tools. As a result, a significant portion of bandwidth and client-side processor and memory utilization are regularly consumed to render infrequently-used elements in frontend user interfaces associated with cloud-based software tools. Furthermore, these elements and associated styles and client-executable scripts increase page load time which can be frustrating to users.

SUMMARY

Embodiments described herein can take the form of a method of operating a backend application associated with a cloud-based software platform. The backend application may be instantiated by interoperation of a processor and a memory allocated for the backend application by a host system, which can include physical infrastructure such as one or more processors, memory, network interfaces, and so on. The method of operating an instantiated backend application, such as described herein, can include the operations of: receiving, at the backend application from a frontend application instantiated by a client device, a request for a page defined by an element tree including at least a set of frontend-executable script elements, a set of user interface elements, and a set of style elements, each style element defining a presentation style for at least one of the user interface elements; determining, by the backend application from the request, client information associated with at least one of the frontend application or the client device; determining, by the backend application from the request, user information associated with an authenticated user of the frontend application; selecting, by the backend application based on the client information and the user information, a first order by which to transmit the set of frontend-executable script elements to the frontend application; selecting, by the backend application based on the client information and the user information, a second order by which to transmit the set of user interface elements to the frontend application; selecting, by the backend application based on the client information and the user information, a third order by which to transmit the set of style elements to the frontend application; and transmitting to the frontend application in response to the request the set of frontend-executable script elements in the first order, the set of user interface elements in the second order, and the set of style elements in the third order.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

DETAILED DESCRIPTION

Figure 1:
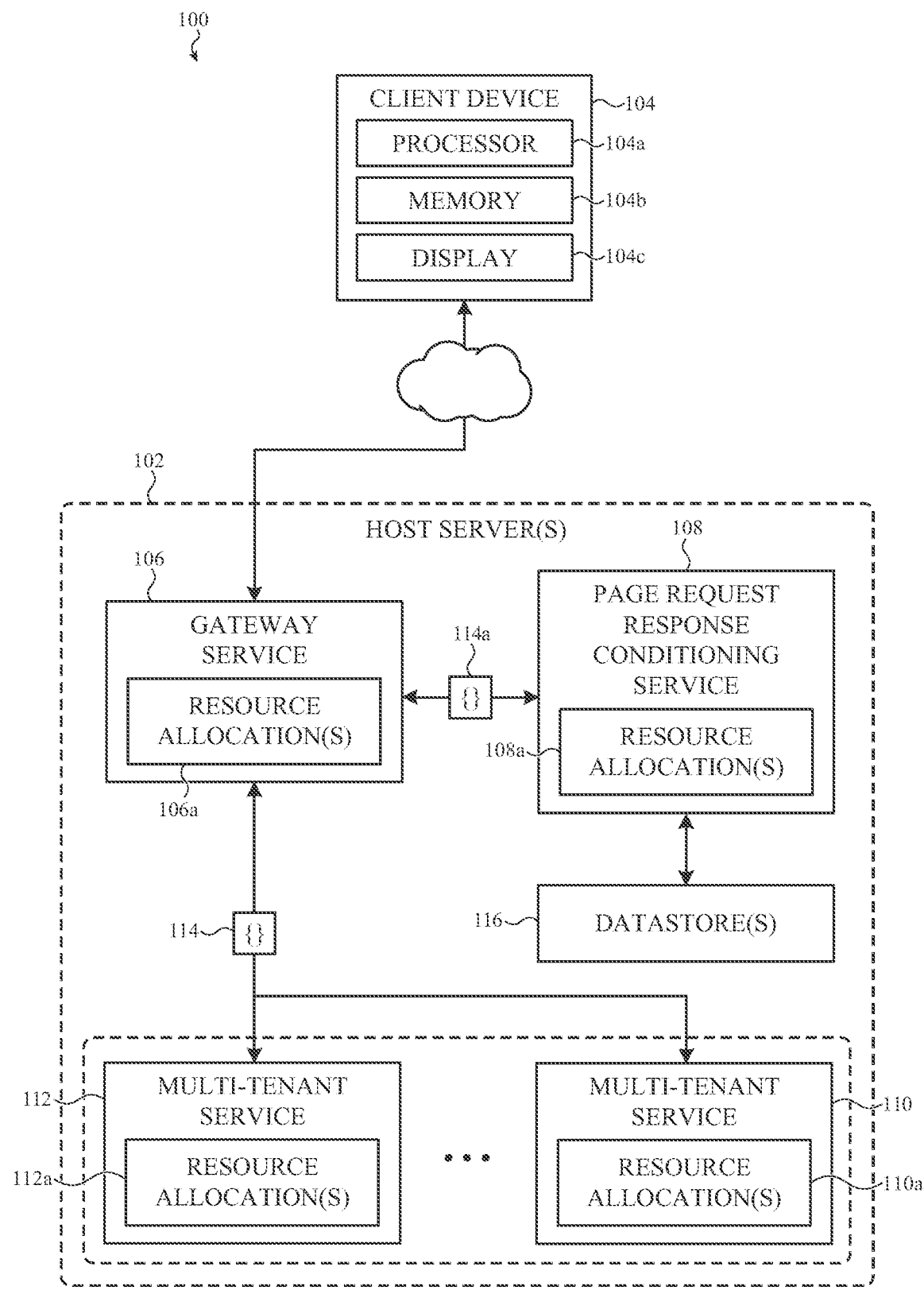
FIG. 1 depicts a simplified system diagram of a collaborative work environment leveraging a page request response conditioning service, such as described herein.

Embodiments described herein relate to systems and methods for decreasing apparent frontend load times for users of one or more multitenant collaboration tools.

More specifically, embodiments described herein relate to systems and methods for tailoring and/or conditioning responses to page requests to minimize apparent page load time on a user-specific basis, a connection specific basis, and/or a client device specific basis.

For example, many embodiments described herein relate to systems and methods for selecting an order by which particular elements of a page tree (e.g., user interface elements, style elements, client/frontend-executable scripts) defining a requested page are loaded or executed. Many embodiments are configured to load/execute user interface elements, style elements, and script elements in an order based on and/or defined at least in part by a likelihood that a user will interact with those elements (or dependences of those elements) within a threshold time of the page being entirely loaded.

In another non-limiting phrasing, embodiments described herein can be configured to determine which elements among a set of page tree elements (defining a requested page) can be loaded/executed on a deferred basis and which elements should be loaded as soon as possible. As a result of these determinations and actions taken therefrom, user interface elements and supporting styles and scripts that are most useful to a particular user are loaded first, and user interface elements and supporting styles and scripts that are unlikely to be used by a particular user are deferred to a later time.

For example, a cloud-based, multitenant, collaboration tool, as described herein, can include a backend and a frontend. The backend can be instantiated as an instance of software (and/or a collection of microservices, serverless features, monolithic services, and the like) instantiated by interoperation of a processor and memory allocated for backend software by a host service. The host service (also referred to as a cloud services provider) may maintain physical infrastructure over which one or more virtual resources, such as virtual processors, memory, communication interfaces, and so on, may be allocated. Herein, an instance of a backend software associated with a particular cloud-based collaboration tool may be referred to as a "backend application."

The backend application of a collaboration tool as described herein can be configured to communicate with a client device configured to communicably intercouple to the backend application. In particular, the client device may be a personal computing device such as a laptop computer or desktop computer; these examples are not exhaustive. The personal computing device can include a processor and a memory configured to cooperate to instantiate a client application configured to render a graphical user interface that defines a frontend for the collaboration tool. The frontend, and in particular the graphical user interface, can be leveraged by a user of the personal computing device to interact with the backend application. Herein, an instance of a client application/frontend software associated with a particular cloud-based collaboration tool may be referred to as a "frontend application."

A frontend application as described herein can be a native application configured to interact with the backend application via an application programming interface (API) defined by and implemented by the backend application.

In other embodiments, a frontend application as described herein can be a browser application configured to interact with the backend application by submitting requests to the backend application via TCP, HTTP, HTTPS, or other similar protocols. For simplicity of description, the embodiments that follow reference an implementation in which the frontend application is a browser application executing on a personal computing device, although it is appreciated that this is merely one example and other constructions, architectures, and implementations are possible.

In one embodiment, a user of a personal computing device (also referred to herein as a "client device") can leverage a browser application instantiated on the personal computing device to submit a HTTP or HTTPS request to the backend application. In response, the backend application can return an HTML-formatted document that can be parsed, when received, by the browser application and provided as input to one or more internal engines of the browser application for layout rendering, style calculations, and/or script execution. As known to a person of skill in the art, the HTML-formatted document can be referred to as a "page" served by the backend application in response to a "page request" that originated from the personal computing device. The page requested by the personal computing device, and served by the backend in response to that request, may be defined by a hierarchical data structure typically referred to as a "page tree" or an "element tree." The page tree can include a set of "elements" including user interface elements (e.g., layout elements), style elements, script elements, and so on. Once the browser application receives the page, the page tree can be parsed (e.g., according to the Document Object Model) and the page can be rendered on a display of the personal computing device.

For embodiments described herein, the backend application can include and/or can be communicably intercoupled with a page request response conditioning service. As used herein, the phrase "page request response conditioning service" refers to an instance of software or a function of instantiated software configured to tailor/customize element trees (and/or elements of an element tree) and/or other portions of an HTML-formatted document in a manner that optimizes apparent loading time at a client device that originated the initial page request. More particularly, as described herein a page request response conditioning service can be configured to determine which scripts, styles, layout elements, and/or user interface elements can be loaded on a deferred basis and which elements should be loaded on an immediate basis. Such determinations may be made on a user-specific basis, a team-specific basis, a software platform-specific basis, a tenant-specific basis, a device-specific basis, a network connection specific basis, or any suitable combination thereof.

As a result of the operation of a page request response conditioning service as described herein, a page returned in response to a page request may appear fully and entirely loaded to a user substantially faster, despite that some deferred assets have yet to be loaded completely.

For example, in one embodiment, a user of a client device, as described herein, may leverage a browser application instantiated on that client device to submit a page request to a backend application of a cloud-based collaboration tool. In a conventional request-response architecture, the backend application may return to the browser application an HTML-formatted document that contains layout elements, style elements, and script elements. More particularly, in conventional request-response architectures, the backend application serves the entire HTML-formatted document to the browser application at once, which in turn parses the document and renders the requested page within a window of the browser application.

In one example, the collaboration tool provides a comment field functionality within the requested page. More specifically, in this example, at least some of the elements of the HTML-formatted document may be associated with styling, layout, and functionality of a comment field rendered at a particular location within the requested page. Rendering of the comment field necessarily consumes both time and client-side resources (e.g., resources such as processors and memory necessary to perform style calculations, layout calculations, and script executions associated with function, layout, and styling of the comment field). In addition, all assets (e.g., scripts, styles, and layout elements) associated with the comment field and its functionality consume a portion of the bandwidth used to service the page request. In this manner, in this conventional architecture, including the comment field as a feature provided by the collaboration tool necessarily increases page load time by a measurable degree.

In many cases, however, a user of the collaboration tool may provide comments very infrequently, if at all, when using the collaboration tool. For such users, the time required to receive, parse, process, execute, and/or perform calculations with assets associated with the comment field are entirely wasted.

More generally and broadly in view of the foregoing example, it may be appreciated that some features of some collaboration tools may be underutilized and/or entirely unused by certain users, groups of users, at certain times of day, at certain locations, and so on. Every time a backend application of such a collaboration tool serves an HTML-formatted document including assets associated with these features, end-user time may be wasted, high-speed bandwidth may be wasted, and/or client-side processor/memory resources may be wasted. These undesirable effects may compound as new and/or more resource intensive features are added to a cloud-based collaboration tools.

The embodiments described herein account for these and other deficiencies of conventional request-response architected cloud-based collaboration tools by determining on a per-user basis (or other custom basis) which assets within an HTML-formatted document (or, more generally a structured document) can and should be loaded on a deferred and/or throttled basis. In a more simple phrasing, embodiments described herein modify HTML-formatted documents (as one example document type; other structured documents are suitable) prior to those documents being transmitted to a client device in order to optimize loading time—or, more precisely, apparent loading time—of features, layout, and functionality that are likely to be used by a particular user, in a particular circumstance or environment.

For example, to continue the preceding example, a page request response conditioning service may be configured to modify the HTML-formatted document to defer loading of all assets related to the comment field until after other layout, styling, and script execution operations are completed.

In this example, in some cases, the page request response conditioning service may be configured to render the comment field in a non-functional manner (e.g., no or substantially no script execution or remote file retrieval takes place) until after other assets of the requested page are fully rendered. In this manner, the comment field appears to be present and functional immediately on page load but is only truly functional at a later time, after the user perceives that the page has completely loaded.

In particular, after other operations associated with loading the page are completed, script executions, WebSocket operations, style and layout calculations and so on associated with providing full functionality of the comment field can be performed, in some examples on a throttled basis and/or in the background.

For users that do not leverage the comment field, this technique achieves an apparent page load faster than conventional architectures, while still providing full functionality to the comment field (eventually), should the user make the unexpected decision to provide a comment.

In another example, a collaboration tool may be an issue tracking system. A page of the issue tracking system may render a number of affordances (e.g., buttons, input fields, and the like) so that users can interact with and update status of different issues tracked by the issue tracking system. In these examples, a reviewing manager may typically only interact with a "close issue" button, whereas a junior developer may never interact with such a button. In this example, when a reviewing manager access a particular page, features and functionality associated with the close issue button may be loaded immediately, whereas for a junior developer accessing the same page, loading of the "close issue" button and associated styles and functionality may be deferred until after other features of the page are fully loaded.

As one particular example, a collaboration tool as described herein may be a collaborative documentation system. The documentation system may be configured to render in a frontend application documents and document content. In addition to rendering document content, the collaboration tool graphical user interface may also provide rich configuration options, template engines, comment field, media import libraries and so on. Each of these functions may be associated with certain styles, layout elements, and client-executable scripts (e.g., JavaScript). Each of these advanced features may be associated with bandwidth consumption, processor/memory utilization, and rendering/layout calculation delays, such as noted above.

In this embodiment, a page request response conditioning service may be configured to receive a page request from a client device. From the request, the page request response conditioning service can extract or infer user-agent information, authenticated user information, connection quality information and so on.

In one example, the page request response conditioning service may be configured to identify a user authenticated to the backend application that is making the request. Once the user is identified, the page request response conditioning service may query a user interaction database to determine what user interface elements the identified user has historically accessed when accessing this particular page or, in some embodiments, similar pages of the documentation system.

In one example, the user may be a junior developer that has not leveraged or used any configuration options, template engines, comment field, media import libraries; the junior developer may only use the documentation system for reference.

In this example, based on the user information, the page request response conditioning service may infer that operations associated with assets/elements related to configuration options, template engines, comment field, media import libraries can be deferred until a later time. In this example, based on the user information, the page request response conditioning service may modify an HTML-formatted document representing the requested page to append a "defer" or "async" tag to one or more script elements associated with these underutilized features. In this example, the entire frontend graphical user interface appears to the junior developer to load very quickly (as most high-overhead assets associated with underutilized features have yet to be executed or calculated or fetched).

These foregoing examples are not exhaustive of the various ways in which a page request response conditioning service as described herein can determine which elements may be loaded/executed on a deferred and/or throttled basis. More generally and broadly, the foregoing example described that certain assets of a page associated with functionality rarely used by a particular user may be automatically loaded on a deferred basis and/or throttled; another user requesting the same page may have a different set of elements loaded on a deferred basis and/or throttled. As such, generally and broadly, it may be appreciated that a page request response conditioning service as described herein can modify HTML served to a client based on the particular user originating the page request.

In other embodiments, a page request response conditioning service may make deferral/throttling (and/or element fetch, or execution ordering) determinations based on a user's role or one or more account properties. For example, administrative users may not have any page assets affected whereas new user accounts (e.g., less than or equal to a threshold period of days old) may flag substantially all features for deferred load. In this example, new users of a collaboration tool may encounter extremely fast loading times, encouraging exploration and interaction with the collaboration tool.

In other embodiments, a page request response conditioning service may make deferral/throttling (and/or element fetch, or execution ordering) determinations based on a time of day or environmental context. For example, historical user interaction data may determine that substantially no users leverage chat functionality after business hours. In this example, if a page that includes chat functionality is requested after business hours, assets related to the chat functionality may be flagged for deferred/throttled load. In other examples, a day of week may inform an operation of the page request response conditioning service; frequently or infrequently used features on Monday may differ (by user, by company, by tenancy, and so on) from frequently or infrequently used features on Friday and so on.

In other embodiments, a page request response conditioning service may make deferral/throttling (and/or element fetch, or execution ordering) determinations based on express preferences. For example, a particular user may expressly set a preference to never load chat features or image processing features. In other cases, a particular user may set a preference to never load animation features or libraries. In yet other cases, a particular user's supervisor may set a preference to always load chat features first so that chat availability for all members of the team is prioritized over other features of a particular page.

In yet other examples, a page request response conditioning service may be configured to prerender at least a portion of a requested page. More broadly, the page request response conditioning service may be configured for complete or partial server-side rendering. In some examples, the page request response conditioning service may be configured to extract from a particular request a user-agent and/or one or more user tokens such that a renderer operated by the page request response conditioning service can properly render at least a portion of a requested page for a particular user, on that user's particular client device. In some cases, server-side rendering may be leveraged to generate non-functional temporary/placeholder user interface elements associated with features flagged for deferred load and/or throttled load.

These foregoing examples are not exhaustive of the different ways in which a system as described herein that incorporates a page request response conditioning service (and/or functionality thereof) can be operated to customize the order in which elements are loaded, accessed, or processed by a client. Further, the systems and methods described herein can be used, in many cases, in any suitable server-client architecture.

In one implementation, the embodiments and architectures described herein reference can be leveraged by a provider of multitenant software and, in particular, by a provider of suites of multitenant software platforms, each platform being configured for a different particular purpose. Herein, providers of systems or suites of multitenant software platforms are referred to as "multiplatform software service providers."

As known to a person of skill in the art, customers/clients of a multiplatform service provider are typically tenants of multiple platforms provided by a given multiplatform service provider. For example, a single organization (e.g., a client of a multiplatform service provider) may be a tenant of an email platform and, separately, a tenant of a calendaring platform.

The organization can create and/or purchase user accounts for its employees so that each employee has access to both email and calendaring functionality. In some cases, the organization may limit seats in each tenancy so that only certain users have access to email functionality and only certain users have access to calendaring functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system, the code repository service, and the documentation service. As with preceding examples, the organization can create and/or purchase user accounts for its employees, so that certain selected employees have access to one or more of issue tracking functionality, documentation functionality, and code repository functionality.

Each of these platforms can be co-operated with a page request response conditioning service as described herein. More broadly, in some embodiments, a multiplatform service provider may instantiate a single cross-platform page request response conditioning service. In other embodiments, each individual platform may incorporate a different page request response conditioning service.

In some cases, a page request response conditioning service, as described herein, can be globally configured based on usage statistics across multiple users, multiple tenancies, or multiple platforms. For example, user interaction data may inform that emoji animation functionality is not used on a regular basis by any tenant of a particular multitenant platform. In this example, the page request response conditioning service may be configured to always flag the emoji animation functionality for deferred load. In other cases, a usage statistics associated with a particular tenant inform that the tenant's users do not typically leverage text editing functionality within the first 15 seconds of loading a page, despite that the feature itself is regularly used. In this example, the page request response conditioning service may be configured to defer loading of text editing functionality until after other page assets are rendered.

In yet another example, a page request response conditioning service may be configured to determine from historical usage data that an organization's users do not use, or rarely use, chat functionality in a first platform. In this example, the page request response conditioning service may flag assets/elements related to the chat feature for deferred load in both the first platform and in a second platform.

In yet another example, a page request response conditioning service can be configured to automatically replace full-featured functionality with minimum functionality until full functionality can be loaded on a deferred basis. For example, a particular form field may be associated with a large and sophisticated validation library that consumes time and resources to load. In this example, the page request response conditioning service can be configured to automatically insert an inline script with basic validation functionality when serving a page to a page requester. At a later time, when the deferred load of the full-featured functionality is complete, the inline script can be replaced (by the client device/frontend application) with an appropriate call or reference to the validation library.

These foregoing and other embodiments are discussed below with reference to FIGS. 1-5 However, those skilled in the art will readily appreciate that the detailed description given herein with respect to these figures is for explanation only and should not be construed as limiting.

FIG. 1 depicts a simplified system diagram of a collaborative work environment 100 leveraging a page request response conditioning service, such as described herein. For simplicity of illustration, the embodiments that follow reference an example construction in which an organization is a tenant of multiple discrete multitenant services that can be leveraged by employees of the organization to advance a common goal.

It may be appreciated that multitenant services are (e.g., platform as a service, software as a service, data as a service, and so on) merely one example of software configurations that can leverage methods and systems described herein. In particular, it may be appreciated that licensed software, single-tenant software, and/or self-hosted software tools can likewise implement systems and methods, and leverage benefits therefrom, such as described herein.

Accordingly, because a person of skill in the art will readily appreciate how asset loading ordering, deferral and/or, throttling techniques described herein can be equivalently applied to many software systems and data architectures, examples that follow reference only multitenant system architectures (e.g., systems leveraging one or more multitenant services for collaboration purposes) for simplicity of description.

Example services that can leverage methods and systems as described herein include, without limitation messaging services; telecommunication services; videoconferencing services; issue tracking services; repository services; documentation services; document management systems; knowledge sharing systems; project management services; enterprise resource planning services; supply chain management services; and so on. Any content added to any of these services, including input(s) provided to customize a particular instance (or tenant experience) of a particular multitenant service, including multimedia data such as images, audio files, or videos, can be considered user-generated, content as described herein.

In the illustrated example, the collaborative work environment 100—which is merely one example of an architecture such as described herein—includes a host server 102 that communicably couples via one or more networking or wired or wireless communication protocols to a client device 104.

It may be appreciated that other client devices may be configured in a substantially similar manner as the client device 104, although this may not be required of all embodiments and different client devices can be configured differently and/or may transact data or information with, and/or provide input(s) to, the host server 102 in a unique or device-specific manner. The client device 104 can be any suitable personal or commercial electronic device and may include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104a of the client device 104 can be configured to execute one or more software applications (each referred to as "client applications") stored, at least in part, in the memory 104b.

Each respective client application can be instantiated by the processor 104a. In particular, the processor 104a may access a persistent memory (e.g., of the memory 104b) to retrieve one or more executable binary files and/or other computer-executable instructions (collectively, "assets"). The processor 104a thereafter can load at least a portion of the retrieved assets into a working memory (e.g., of the memory 104b), thereby at least partially instantiating the respective client application. For simplicity of description an implementation in which the client device 104 is configured to execute/instantiate a single client application, which is a browser application, is described below.

In embodiments, the host server 102 is configured to operate within or as a virtual computing environment that is supported by one or more physical servers including one or more hardware resources such as, but not limited to (or requiring) one or more of: a processor; a memory (also referred to as a working memory); non-volatile storage (also referred to as persistent memory); networking connections; and the like.

Specifically, it may be appreciated that although referred to as a singular "server", the host server 102 may be a cluster of different computing resources, which may be geographically separated from one another.

In this manner, generally and broadly, both the host server 102 and the client device 104 can be referred to, simply, as "computing resources" that are communicably coupled to one another via a suitable network connection.

As used herein, the term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As noted above, the host server 102—and in particular a backend application instantiated over a virtual or physical processor and memory allocated for the backend application—and the client application supported/executed by the client device 104 are communicably intercoupled via a suitable network connection which may be wired, wireless, or a combination thereof. In some examples, the network connection may include the open Internet via a protocol such as TCP, HTTP, HTTPS, and the like. Although not required, in many embodiments, a cryptographically secure protocol may be used, such as HTTPS so that the client application and the backend application can exchange information in a secure manner.

In other cases, the network connection coupling the host server 102 and the client application may include only a private intranet managed by, or otherwise utilized by, an organization, such as referenced above.

The host server 102 and the client application can communicate according to any suitable protocol, form, or format. In many examples, the host server 102 at least partially exposes an API that can be accessed by the client application to perform one or more functions. For example, the client application may leverage the API to request pages (such as described herein) from the host server 102 and/or the backend application instantiated by the host server.

For simplicity of description, the embodiments that follow reference a configuration in which the host server 102 and the client application are configured to communicate and transact information according to a REST API, but it may be appreciated that this is merely one example and in other embodiments other signaling, communication, or data transaction methodologies may be used.

As noted above, the host server 102 of the collaborative work environment 100 can be configured and/or implemented in a number of suitable ways. For example, in many embodiments the host server 102 can leverage physical and/or virtual resources allocated to it to instantiate any suitable number of discrete subservices or purpose-configured modules, containers, virtual or physical networks, or virtual machines each configured to perform, coordinate, host, serve, or otherwise provide one or more services, functions, or operations of the host server 102, such as a gateway service 106.

The gateway service 106 can be hosted by a virtual machine or container executing over physical or virtual resources of the host server 102; collectively the physical and/or virtual resources allocated to instantiate the gateway service 106 are identified in the figure as the resource allocation(s) 106a. As with other embodiments described herein, the resource allocation(s) 106a can include, but may not be limited to (or may not require) one or more of: a processor; a memory; non-volatile storage; networking connections; and the like.

For example, in many constructions, the gateway service 106 is implemented in whole or in part as a software instance. The software instance defining the gateway service 106 may be instantiated by a processor among the resource allocation(s) 106a. In particular, the processor may access a persistent memory to retrieve one or more executable assets. The processor thereafter can load at least a portion of the retrieved assets into a working memory, thereby at directly or indirectly instantiating the gateway service 106.

In some embodiments, the gateway service 106 may be provided as a serverless function, may be provided as a reverse proxy, may be provided as a router appliance or as any suitable software and/or hardware appliance configurable to communicably couple at least to the client device 104 and to service requests for information therefrom, such as requests for one or more pages, such as described herein.

In other implementations, although not illustrated, the gateway service 106 may be executed/instantiated separately from the host server 102 altogether.

As noted with respect to other embodiments described herein, the gateway service 106 can be configured to receive requests and serve responses specifically related to one or more pages created and/or managed within an environment defined at least in part by a multitenant software service Such requests for one or more pages may include requests for permissions validation and/or may automatically trigger one or more permissions compliance verification operations. In some cases, the gateway service 106 may also be configured for authentication operations, but for simplicity of description the embodiments that follow reference only permissions based decision-making.

In many embodiments, the gateway service 106 is primarily configured to receive page requests from one or more client applications instantiated on one or more client devices. Once a page request is received at the gateway service 106, the request can be forwarded (either modified or unmodified) to an appropriate backend application instance, such as a backend instance associated with a multitenant service 110 (supported by appropriate resource allocations 110a) or a multitenant service 112 (also supported by appropriate resource allocations 112a).

In response to the page request, the backend application can generate, prerender, or otherwise access from a datastore a cached version of, an HTML-formatted document 114, such as described herein.

The HTML-formatted document 114 can be defined by an element tree (as known to a person of skill in the art) which can include script elements (e.g., JavaScript), layout elements (HTML DOM elements), and/or one or more style elements (e.g., inline style sheets, Cascading Style Sheets (CSS)) and so on. As known to a person of skill in the art, these HTML elements are each associated with computational operations to be performed by the client application; the greater the number of layout elements, styles, and scripts associated with a particular page, the larger the HTML-formatted document 114 may be (consuming more bandwidth and time to transmit to the client device), and the longer it may take to completely render by the client application. This may be particularly true for lower power or older client devices.

An example multitenant service configured to serve HTML-formatted documents to client devices is a project management service. In this example, one or more pages (HTML-formatted documents) may include, within a section of the page, a task list attributed to, or otherwise associated with, a particular user of the project management service.

At some instant, the user—having been previously authenticated by a service such as a single sign-on service or other credential verification service—may operate the client device 104 to initiate a request intended to be received by the project management service to retrieve the page that includes that user's task list.

After the authenticated user of the client device 104 is determined to be authorized to view the task list, an HTML-formatted document including layout elements, script elements, and style elements defining the page and in addition, the task, list can be transmitted via a suitable channel in a suitable format (e.g., the HTML-formatted document 114), via the gateway service 106 to the client device 104 for rendering in a graphical user interface defined by the client application and displayed on the display 104c.

More particularly, in this example, the gateway service 106 interposes the project management service and the client application, routing authorized and policy-compliant requests for one or more pages (e.g., the task list) originating from the client application, to the project management service.

As understood by a person of skill in the art, as a part of servicing this request from the client device 104, the gateway service 106 can determine whether the already-authenticated user currently using the client device has permission to access the requested one or more pages, in this case, the task list. If the gateway service 106 determines that the user is not authorized to access the page, the request may be blocked.

In many embodiments, the gateway service 106 may be configured to transmit the HTML-formatted document 114 to a page request response conditioning service 108 configured, as described herein, to condition/tailor the HTML-formatted document 114 received form the gateway service 106 for fast apparent loading time on the client device. The HTML-formatted document transmitted from the gateway service 106 to the page request response conditioning service 108 is identified in FIG. 1 as the HTML-formatted document 114*a*.

For example, in some embodiments, the page request response conditioning service 108 can be configured to change an order of elements in the HTML-formatted document 114*a* min a user-specific manner, a device-specific manner, or a bandwidth/network connection specific manner. For example, over a low-bandwidth connection to a particular client device, the HTML-formatted document 114*a* may be rearranged such that style elements and script elements necessary to render the page are ordered before styles and scripts necessary for animations, backend communications (e.g., WebSockets and the like), so that asynchronous processing/fetching tasks related to visually presenting the page are initiated before functional scripts (or styles) related to rendering animations.

In further examples, the page request response conditioning service 108 can be configured to defer loading of animation assets so that no tasks related to animations take place until after other portions of the page are rendered. In other cases, the page request response conditioning service 108 can cause animation assets to be fetched, loaded, or executed on a throttled basis after the page has loaded.

In some cases, the page request response conditioning service 108 can modify the HTML-formatted document 114*a* to provide limited functional support to animation features while full animation libraries or styles are fetched, executed, or calculated in the background by the client application.

For example, the page may reference a remote JavaScript animation library that provides functions for smoothly opening one or more menus of the page. In this example, the remote library may include a number of functions not called or not used by the page. In one example, the page request response conditioning service 108 can be configured to parse through the page tree to determine what functions of the library are called by the page and can thereafter automatically reduce a copy of the remote library to only those functions and dependencies actually called by the page when rendering. For example, the HTML-formatted document 114*a* received by the page request response conditioning service 108 may be:

```
<html lang="en">
<head>
<title>Requested Page</title>
<link rel="stylesheet" href="styles.css?v=1.0">
<script src="https://remote.tld/full_library.js?v=1.0"></script>
</head>
<body>
```

-continued

```
<div id="menu"></div>
<script src="js/animate_menu.js"></script>
</body>
</html>
```

Upon receiving the HTML-formatted document 114*a*, the page request response conditioning service 108 may iteratively and/or recursively determine which functions of full_library.js are called by one or more functions of animate_menu.js. In response, the page request response conditioning service 108 may create a new script file (and/or may embed into the HTML-formatted document 114*a*) a reduced version of full_library.js. For example, the resulting modified HTML-formatted document 114*a* may be:

```
<html lang="en">
<head>
<title>Requested Page</title>
<link rel="stylesheet" href="styles.css?v=1.0">
<script src="js/reduced_library.js"></script>
</head>
<body>
<div id="menu"></div>
<script src="js/animate_menu.js"></script>
</body>
</html>
```

In other examples as noted above, the page request response conditioning service 108 may be configured to defer loading of the animation functionality if the page request response conditioning service 108 determines that the client device that made the page request has reduced bandwidth. For example, the resulting modified HTML-formatted document 114*a* may be:

```
<html lang="en">
<head>
<title>Requested Page</title>
<link rel="stylesheet" href="styles.css?v=1.0">
<script src="js/reduced_library.js"></script>
</head>
<body>
<div id="menu"></div>
<script src="js/animate_menu.js" defer></script>
</body>
</html>
```

In yet other examples, the page request response conditioning service 108 may be configured to modify the HTML-formatted document 114*a* to change async loading tags with deferred loading tags. In such examples, different users with different bandwidths and different client devices can receive different HTML. For example, a high bandwidth connection to high performance client device, as detected by the page request response conditioning service 108 (e.g., via user-agent string parsing, settings, user account data and so on) may trigger the page request response conditioning service 108 to remove any deferred loading or asynchronous loading flags so that features and functionality and layout may all be rendered simultaneously for the high-performance user.

In another example, a high bandwidth connection to a low performance client device, as detected by the page request response conditioning service 108 may trigger the page request response conditioning service 108 to insert asynchronous loading tags for one or more script elements or style sheet elements so that features and functionality and layout may all be rendered as soon as assets are available, without interfering with parsing operations related to layout or styling of the page itself.

In another example, a low bandwidth connection to a low performance client device, as detected by the page request response conditioning service 108 may trigger the page request response conditioning service 108 to insert deferred loading tags for one or more script elements or style sheet elements so that features and functionality and layout may all be rendered only after the page load is complete.

In further embodiments, the page request response conditioning service 108 may be configured to make prerendering (server-side rendering), element ordering, deferred loading, asynchronous loading, or throttled loading modifications to the HTML-formatted document 114*a* based on inputs, metadata, and/or settings or preferences unrelated to bandwidth or client device types, such as data that may be stored in a datastore 116.

In particular, as noted above, such determinations/modifications can be made on a per-user basis based on historical user interaction data. For example, if the page request response conditioning service 108 determines that the user has not historically accessed the animated menu, the page request response conditioning service 108 may determine that loading of animation assets can be deferred, regardless of bandwidth or the user's client device.

In other embodiments, the page request response conditioning service 108 can modify the HTML-formatted document 114*a* based on, without limitation: a user's role; administrator preferences; a user's historical user interactions with a particular page or with similar pages or page types; a user's current task list as recorded by an issue tracking system or a project management system; time of day; time of year; geographic location of the user; connection type (e.g., ethernet, cellular, DSL, broadband, Wi-Fi); software versions of a frontend application or a backend application; software versions of a user's browser; and so on.

These examples are not exhaustive; a person of skill in the art may readily appreciate that page request response conditioning service 108 as described herein can make any suitable modifications to any suitable page served by any suitable collaboration platform. In some embodiments, multiple modifications to an HTML-formatted document may be made to improve apparent loading time for a particular user, using a particular electronic device, at a particular time of day, across a particular network connection; a first modification may be made based on bandwidth, a second modification may be made based on the user's preferences, a third modification may be made based on the user's historical user interaction data, a fourth modification may be made base on an express preference of the user's supervisor, and so on.

These foregoing embodiments depicted in FIG. 1 and the various alternatives thereof and variations thereto are presented, generally, for purposes of explanation, and to facilitate an understanding of various configurations and constructions of a page request response conditioning service (including a gateway), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
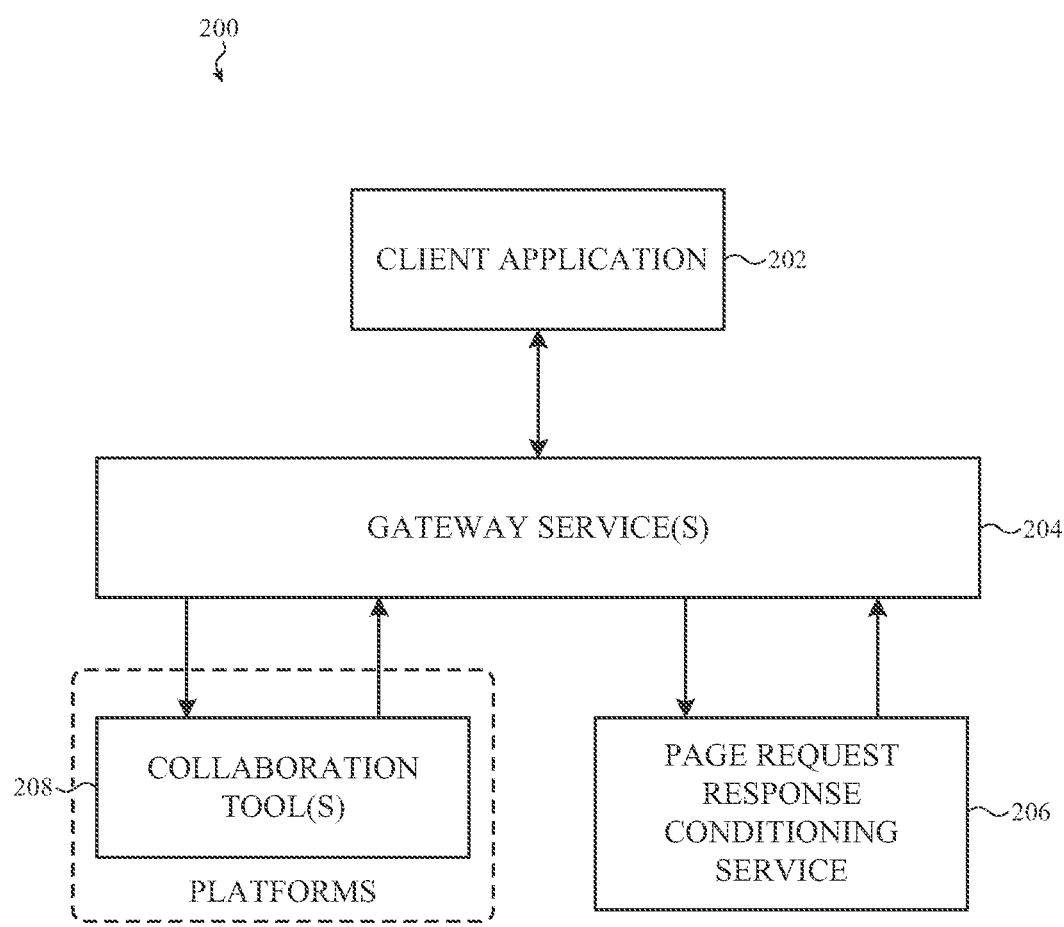
FIG. 2 depicts a simplified system diagram of system incorporating a page request response conditioning service, such as described herein.

FIG. 2 depicts a simplified system diagram of a page request response conditioning service, such as described herein. The system 200 services requests from a client device that may be configured to execute one or more instances of one or more client applications, such as described above. The client device may be configured as described above with reference to the client device 104 of FIG. 1; this description is not repeated.

As noted above, a client application instance (more simply, the "client application") executing on the client application 202 may be a native application, a browser application pointing to a particular address, or may any other suitable application or application or function wrapper. In the illustrated embodiment, the client application is identified as the client application 202. Regardless of the specific implementation of the client application 202, it is configured to communicably couple to a multitenant service. As one example, the client application 202 may be a local code repository management application and the multitenant service may be a code repository service.

As with other embodiments described herein, the client application 202 is communicably coupled to a gateway 204. The gateway 204 is in turn communicably coupled to a page request response conditioning service 206 and one or more multitenant collaboration tools 208.

As with other embodiments described herein, the page request response conditioning service 206 can be implemented as a single server or service or, in other cases, may be implemented as a distributed platform (having any suitable architecture and/or synchronization technique) in which two or more instances of a page request response conditioning service are instantiated.

In some cases, different instances can be instantiated in different geographic locations. In other cases, different instances can be instantiated in the same geographic location, and one may serve an overload protection and/or a load balancing purpose with respect to the other. For simplicity of description, a single instance is shown and labeled as the page request response conditioning service instance 206.

Similarly, the one or more multitenant collaboration tools 208 can be implemented as or on a single server or service or, in other cases, may be implemented as a distributed platform (having any suitable architecture and/or synchronization technique) in which two or more instances of a different platforms and/or services associated with those platforms are instantiated. In some cases, different instances can be instantiated in different geographic locations. In other cases, different instances can be instantiated in the same geographic location, and one may serve an overload protection and/or a load balancing purpose with respect to the other. For simplicity of description, a single instance is shown and labeled as the multitenant collaboration tool 208.

As a result of the depicted architecture, any content request initiated by the client application 202 is routed, initially, through the gateway service 204 to the collaboration tool 208. The collaboration tool 208 can provide an HTML-formatted output that can be returned to the gateway service 204 and/or can be directed to the page request response conditioning service 204. The page request response conditioning service 210 receives the content request from the gateway service 204 and based on, in one example, a content identifier and a user identifier, determines whether the identified user is permitted to access the identified content. In some cases, the page request response conditioning service 206 may be configured to load into memory one or more data sets, business rules, user preferences, and so on that can be used to make a determination, such as described herein, of how to modify a particular page request to optimize apparent loading time for the end user. Such modifications can be made based on user preferences, user historical use, team historical use, and so on.

These foregoing embodiments depicted in FIGS. 1-2 and the various alternatives thereof and variations thereto are presented, generally, for purposes of explanation, and to facilitate an understanding of various configurations and constructions of a page request response conditioning service (including a gateway), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, generally and broadly it may be appreciated that a system as described herein can be configured specifically to decrease apparent load times for a particular user. The apparent loading time can be decrease by deferring computationally expensive (or otherwise unnecessary to perform for a particular user) calculations, operations, or script executions that are unimportant to the particular user until after other elements of the page are visually loaded. This technique affords to the user a sense that a page is completely loaded.

Phrased in another way, features and functionality regularly used by a user may be loaded first along with user interface elements—but not functionality or at least not full functionality—of features not regularly used by the user. Loading of these resources can be deferred and performed in the background. In this manner, the page will be loaded with full functionality after a period of time, but the page will appear to load in a manner usable to the user substantially faster, thereby decreasing apparent page load time.

Figure 3A:
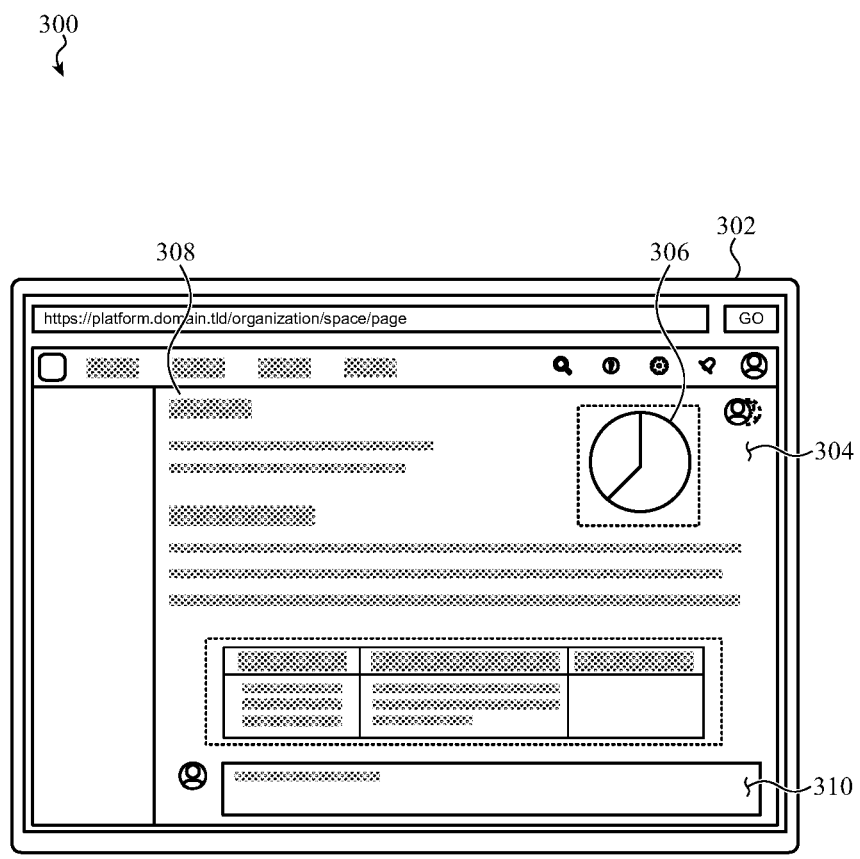
FIGS. 3A-3B depict a user interface rendered by a frontend of a system, such as described herein.

FIG. 3A depicts a client device 300 that includes a display 302. The display 302 can be leveraged by a client application (frontend application) as described herein to render a graphical user interface 304. The graphical user interface 304 may be defined at least in part by an HTML-formatted document modified for the particular user of the client device 300 by a page request response conditioning service as described herein.

For example, the user may historically not interact with animated graphics associated with a visualization feature 306. The user may, however, often hover a cursor over a title 308 prior to scrolling through text content of the page. The user may never utilize a comment function 310. Each of these user interaction histories may be obtained by querying a user interaction database. In some cases, the page request response conditioning service may query the user interaction database to obtain this information.

Recognizing that the user typically interacts with the title 308 and text content of the page first, the page request response conditioning service may tailor the HTML-formatted document to render these elements, along with associated style calculations and script executions, as soon as possible.

However, because the user does not typically interact with animated data, such may be shown in the visualization feature 306, scripts and/or styles associated with providing rich visualizations or animations may be marked for deferred load. In this manner, as the user loads the page via the client application, a non-functional representation of the visualization feature 306 (e.g., a static, non-animated image; a static visualization without customization options presented or functional, and so on) may be rendered for the user, to give the user the impression that the visualization feature 306 is fully operational.

Figure 3B:
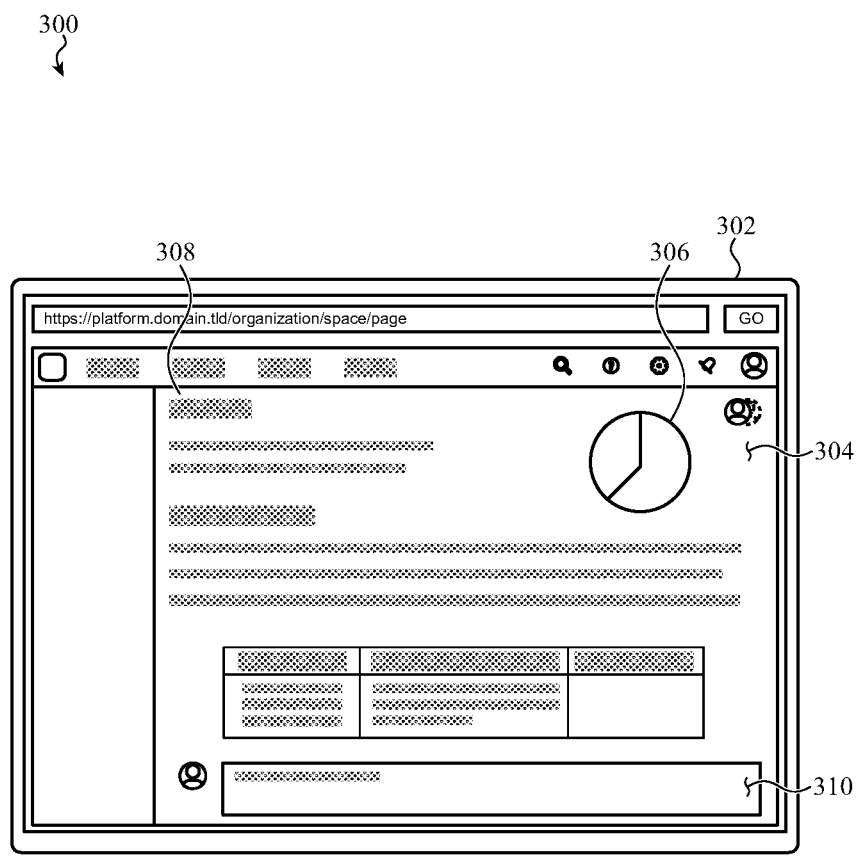

Necessary supporting computations (e.g., triggered by script executions or style calculations) can be deferred until a later time, and may be silently loaded in the background as the user interacts with the page (see, e.g., FIG. 3B, depicting the user interface of FIG. 3A after all assets, including deferred assets, have been loaded). For simplicity of illustration, FIGS. 3A-3B is presented with dotted boxes surrounding elements associated with functionality that has been loaded on a deferred, delayed, asynchronous, or throttled basis.

Recognizing that the user typically does not interact with the comment function 310, the page request response conditioning service may tailor the HTML-formatted document to load such functionality on a deferred basis. However, in some examples, an organization or supervisor policy may override this decision, causing the page request response conditioning service to automatically load the comment feature along with the title 308 and the text features of the page.

These foregoing example embodiments are not exhaustive of the different modifications a page request response conditioning service as described herein may make to an HTML-formatted document requested by a user. In some cases, for example, the page request response conditioning service may cooperate with a cloud-based collaboration platform backend to generate custom HTML in response to a user's request. In this architecture, modification of an existing HTML-formatted document may not be required.

In other cases, the page request response conditioning service can include and/or can interoperate with a server-side rendering service that can pre-render a portion of or an entirety of a particular page requested. Many embodiments are possible.

Figure 4:
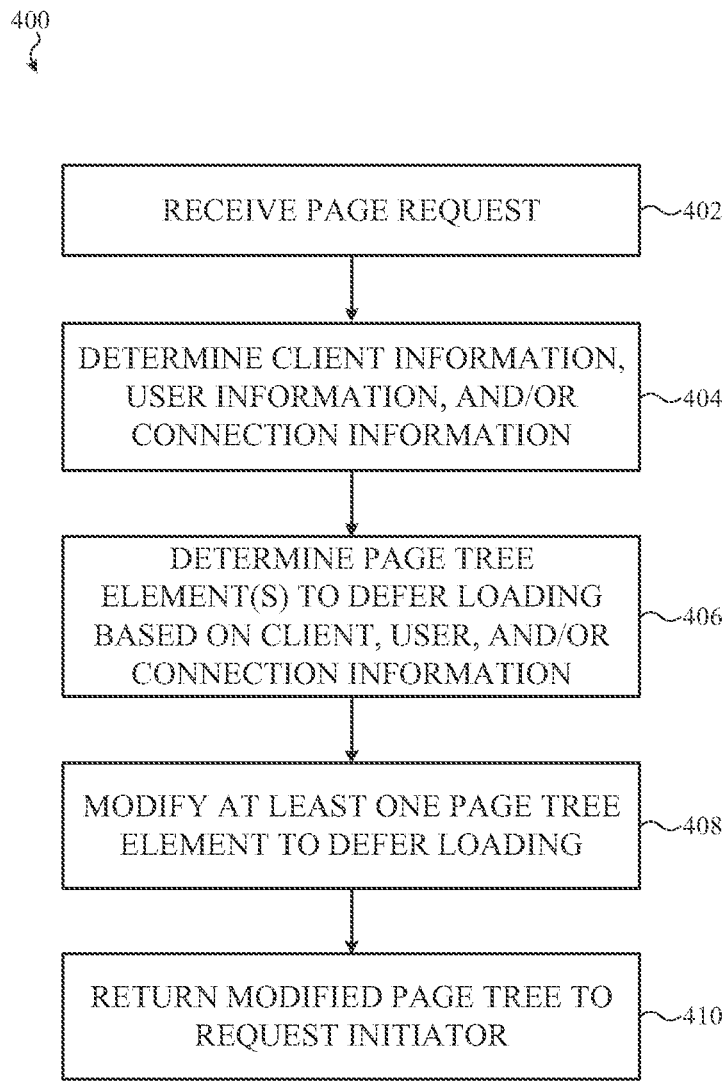
FIG. 4 is a flowchart depicting example operations of a method of operating a page request response conditioning service, such as described herein.

FIG. 4 is a flowchart depicting example operations of a method of operating a page request response conditioning service, such as described herein. The method 400 can be performed by a page request response conditioning service as described herein. In some cases, portions of the method may be performed at least in part by a gateway service as described herein. In some cases, a client device/client application can cooperate with a page request response conditioning service to execute or perform one or more operations of the method 400.

The method 400 includes operation 402 at which a page request is received, such as by a gateway service as described herein or as by a page request response conditioning service as described herein.

The method 400 can advance to operation 404 at which client information, user information and/or connection information can be obtained from the request received at operation 402. Operation 404 can be performed, in one example, by parsing a user-agent string or user auth token transmitted with the original request received at operation 402. The client information may correspond to information about a client application or client device that originated the request, the user information may correspond to information about a user operating that client device (or otherwise authenticated to the client application or an associated backend system, such as a single sign on service), and the connection information can correspond to one or more parameters describing a networking connection between the client device and the backend application.

The method 400 can advance to operation 406 at which an HTML-formatted document, defined by a page tree is received at the page request response conditioning service. The page request response conditioning service can parse the page tree and determine one or more elements—such as layout elements, script elements, or style elements—that can be modified or changed to decrease the apparent loading time experienced by the user. Thereafter at operation 408, the modifications may be made and at operation 410, the modified page can be transmitted back to the client application that initiated the request.

Figure 5:
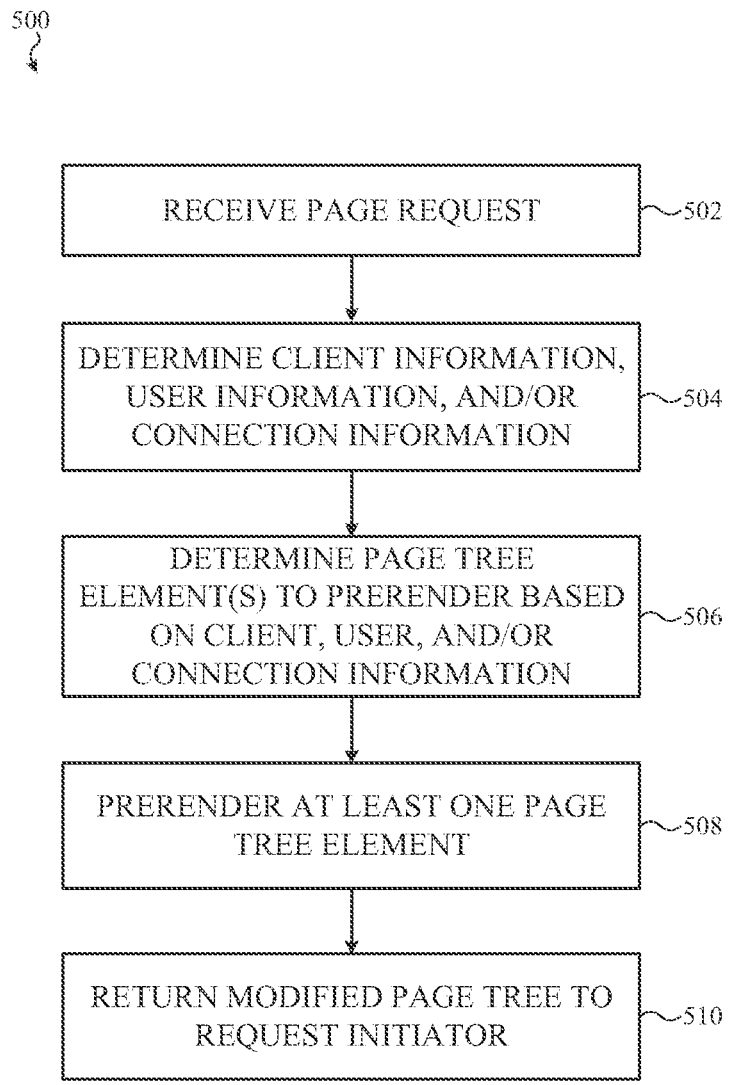
FIG. 5 is a flowchart depicting example operations of a method of operating a page request response conditioning service, such as described herein.

FIG. 5 is a flowchart depicting example operations of a method of operating a page request response conditioning service, such as described herein. As with the method 400, the method 500 can be performed by a page request response conditioning service as described herein. In some cases, portions of the method may be performed at least in part by a gateway service as described herein. In some cases, the method 500 can be performed by a server-side rendering service, as described herein. In some cases, a client device/client application can cooperate with a page request response conditioning service to execute or perform one or more operations of the method 500.

As with other embodiments, the method 500 includes operation 502 at which a page request is received, such as by a gateway service as described herein or as by a page request response conditioning service as described herein.

As with other embodiments, the method 500 can advance to operation 504 at which client information, user information and/or connection information can be obtained from the request received at operation 502.

As with the method 400 of FIG. 4, operation 504 can be performed, in one example, by parsing a user-agent string or user auth token transmitted with the original request received at operation 502. As noted above, the client information may correspond to information about a client application or client device that originated the request, the user information may correspond to information about a user operating that client device, and the connection information can correspond to one or more parameters describing a networking connection between the client device and the backend application.

The method 500 can advance to operation 506 at which an HTML-formatted document, defined by a page tree is received at the page request response conditioning service. The page request response conditioning service can parse the page tree and determine one or more elements—such as layout elements, script elements, or style elements—that can be prerendered, server-side, to decrease the apparent loading time experienced by the user. Thereafter at operation 508, the modifications may be made and at operation 510, the modified page can be transmitted back to the client application that initiated the request.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

Further, many foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A method of operating a backend application instantiated by interoperation of a processor and a memory allocated for the backend application by a host system, the method comprising:
receiving, at the backend application from a frontend application instantiated by a client device, a request for a page defined by an element tree comprising:
a set of frontend-executable script elements;
a set of user interface elements; and a set of style elements, each style element defining a presentation style for at least one of the user interface elements;
determining, by the backend application from the request, client information associated with at least one of the frontend application or the client device;
determining, by the backend application from the request, user information associated with an authenticated user of the frontend application;
executing, by the backend application, a query of a user interaction database to determine a use metric indicating the authenticated users prior interaction with elements of the page;
selecting, by the backend application and based on the use metric, a first order to transmit the set of frontend-executable script elements the front-end application;
selecting, by the backend application and based on the use metric, a second order to transmit the set of user interface elements to the front-end application;
selecting, by the backend application and based on the use metric, a third order to transmit the set of style elements to the frontend application; and
transmitting to the frontend application in response to the request:
the set of frontend-executable script elements for execution by the frontend application in the first order;
the set of user interface elements for execution by the frontend application in the second order; and
the set of style elements for execution by the frontend application in the third order.

2. The method of claim 1, comprising prerendering at least a subset of the set of user interface elements prior to transmitting to the frontend application, the subset selected at least in part based on a user-agent string extracted from the client information.

3. The method of claim 1, comprising pre-executing at least a subset of the set of frontend-executable script elements prior to transmitting to the frontend application, the subset selected at least in part based on historical user interaction information extracted from the user information.

4. The method of claim 1, comprising pre-executing at least a subset of the set of style elements prior to transmitting to the frontend application, the subset selected at least in part based on a network connection type extracted form the connection information.

5. The method of claim 1, comprising:
determining, by the backend application from the request, bandwidth information associated with a network connection between the frontend application and the backend application; wherein
at least one of the first order, the second order, or the third order is based on the bandwidth information.

6. The method of claim 1, wherein at least a portion of the set of frontend-executable script elements is transmitted after each of the set of user interface elements is transmitted.

7. The method of claim 1, wherein at least a portion of the set of style elements is transmitted after each of the set of user interface elements is transmitted.

8. The method of claim 1, wherein at least a portion of the set of frontend-executable script elements is transmitted with the set of user interface elements.

9. The method of claim 1, wherein at least a portion of the set of frontend-executable script elements is transmitted with the set of style elements.

10. A method of submitting a request to a backend application instantiated by interoperation of a processor and a memory, allocated for the backend application by a host system, the method comprising:
transmitting, to the backend application from a frontend application instantiated by a client device, a request for a page the request comprising:
client information describing the frontend application and the client device; and
user information describing a user of the client device authenticated to the frontend application;
receiving in response to the request, a first response comprising:
a first subset of user interface elements selected from a set of user interface elements for the page by the backend application and based on a use metric indicating the user prior interaction with elements of the page; and
a first subset of frontend-executable script elements selected from a set of frontend-executable elements for the page by the backend application and based the use metric;
rendering, by the frontend application, the first subset of user interface elements;
executing, by the frontend application, the first subset of frontend-executable script elements;
receiving after the first response, a second response comprising:
a second subset of user interface elements selected from the set of user interface elements for the page by the backend application and based on the use metric; and
a second subset of frontend-executable script elements selected from the set of frontend-executable elements for the page by the backend application and based the use metric;
rendering, by the frontend application, the second subset of user interface elements; and
executing, by the frontend application, the second subset of frontend-executable script elements.

11. The method of claim 10, wherein the client information comprises identifying information of the frontend application.

12. The method of claim 10, wherein the client information comprises identifying information of the client device.

13. The method of claim 10, wherein the client information comprises identifying information describing a network connection between the frontend application and the backend application.

14. The method of claim 10, wherein the first subset of user interface elements is transmitted prior to the first of frontend-executable script elements.

15. The method of claim 10, wherein the frontend application is a browser application.

16. A method of serving a page defined by an element tree comprising a set of frontend-executable script elements from a backend application instantiated by interoperation of a processor and memory allocated by a host system, the method comprising:
receiving a request, from a client device associated with an authenticated user, for the page from a frontend application;
executing, by the backend application, a query of a user interaction database to determine prior interaction information of the authenticated user with respect to elements of the page;
determining, by the backend application, an order to transmit to the frontend application the set of frontend-executable script elements using the prior interaction information, the order based on usage statistics associated with elements of the page tree corresponding to respective frontend-executable script elements of the set of frontend executable script elements; and transmitting the set of frontend-executable script elements to the frontend application for execution by the frontend application in the determined order.

17. The method of claim 16, wherein the frontend application and the backend application define a collaboration tool.

18. The method of claim 17, wherein the collaboration tool comprises one of:
an issue tracking system;
a documentation system;
a messaging system; or
a code repository system.

19. The method of claim 16, wherein the order is based at least in part on bandwidth information describing a network connection coupling the frontend application and the backend application.

* * * * *